(12) United States Patent  
Ohta

(10) Patent No.: US 6,909,041 B2  
(45) Date of Patent: Jun. 21, 2005

(54) SOUND FIELD CONTROL METHOD AND SOUND FIELD CONTROL SYSTEM

(75) Inventor: Yoshiki Ohta, Saitama (JP)

(73) Assignee: Pioneer Corporation, Tokyo (JP)

( * ) Notice: Subject to any disclaimer, the term of this patent is extended or adjusted under 35 U.S.C. 154(b) by 140 days.

(21) Appl. No.: 10/322,662

(22) Filed: Dec. 19, 2002

(65) Prior Publication Data

US 2003/0159569 A1 Aug. 28, 2003

(30) Foreign Application Priority Data

Feb. 28, 2002 (JP) ..................... P2002-053483

(51) Int. Cl.[7] ............. G10H 1/02; G10H 7/00
(52) U.S. Cl. .............. 84/630; 84/610; 84/626; 84/634; 84/650; 84/662
(58) Field of Search .............. 84/600–603, 609–610, 84/615–616, 626, 630, 649–650, 653–654, 662, 701, 707, DIG. 11, DIG. 26; 381/61, 63

(56) References Cited

U.S. PATENT DOCUMENTS

| | | | | |
|---|---|---|---|---|
| 5,025,472 A | * | 6/1991 | Shimizu et al. ............... | 381/63 |
| 5,642,425 A | * | 6/1997 | Kawakami ................... | 381/63 |
| 5,652,798 A | * | 7/1997 | Mizushima .................. | 381/63 |
| 6,399,868 B1 | * | 6/2002 | Yamato et al. ............... | 84/701 |
| 2003/0121403 A1 | * | 7/2003 | Miyagishima et al. ........ | 84/735 |
| 2003/0126975 A1 | * | 7/2003 | Urai et al. .................... | 84/737 |
| 2004/0025675 A1 | * | 2/2004 | Miyazaki et al. ............. | 84/736 |

FOREIGN PATENT DOCUMENTS

| | | |
|---|---|---|
| EP | 0 571 635 A1 | 12/1993 |
| EP | 0 624 947 A2 | 11/1994 |

OTHER PUBLICATIONS

Japanese Abstract No. 57188119, dated Nov. 19, 1982.  
Japanese Abstract No. 56066919, dated Jun. 5, 1981.

* cited by examiner

*Primary Examiner*—Marlon Fletcher  
(74) *Attorney, Agent, or Firm*—Sughrue Mion, PLLC

(57) ABSTRACT

Reverberation characteristics of an original sound field and a reproduction sound field are measured and a difference between the reverberation characteristics is obtained. A reflected sound pattern added to reproduction sound is calculated so that the reverberation characteristics of the reproduction sound field approximate to the reverberation characteristics of the original sound field from the difference between the reverberation characteristics and is added and reproduced in the reproduction sound field. A frequency is divided into predetermined bands and a reflected sound pattern to be added is obtained similarly in the respective bands and is added to the corresponding frequency band of the reproduction sound and reproduced. Measurement of the reverberation characteristics is obtained by inputting an impulse signal to a speaker and collecting a generated sound wave by a microphone provided in a position corresponding to the head of a listener and analyzing the sound wave by an analyzer.

11 Claims, 13 Drawing Sheets

SOUND FIELD CONTROL METHOD AND SOUND FIELD CONTROL SYSTEM

CROSS REFERENCE OF RELATED APPLICATION

This application is based on and claims priority under 35 U.S.C. §119 with respect to Japanese Patent Application No. 2002-053483 filed on Feb. 28, 2002, the entire content of which is incorporated herein by reference.

BACKGROUND OF THE INVENTION

1. Field of the Invention

The present invention relates to a sound field control method and a sound field control system for obtaining reproduction sound with full realism by adding predetermined reverberation to the reproduction sound in sound reproduction in a reproduction sound field.

2. Description of the Related Art

Conventionally, propositions of methods or systems for obtaining sound with full realism in the case of reproducing and listening to music have been made. As one of the propositions, there is a system called a trans-aural system. This trans-aural system is a system for attempting to obtain realism similar to that of the case listening in target sound space by listening to sound recorded in both of ear portions of a dummy head placed in a position corresponding to a position of a listener in target sound space in a reproduction sound field.

This provides sound information similar to that on a recorded sound field for a listener by matching sound pressures PL, PR of respective external auditory meatus entrances of both of right and left ears of the dummy head in the case of recording with sound pressures SL, SR of respective external auditory meatus entrances of both of right and left ears of the listener in the reproduction sound field. In order to achieve such a reproduction state, there is provided a reproduction equivalent filter called a crosstalk cancel filter and control of the reproduction sound field is performed.

Also, as a method for obtaining sound with full realism similarly, there is a signal processing apparatus called a reverberation addition apparatus. Generally, this has an initial reflected sound generation part with a finite length in a front stage of a system and adds its output signal to a reproduction sound source in a reverberation generation part of a backstage. A form in which filters of IIR (Infinite Impulse Response) type like a comb filter are arranged in parallel is generally used as the reverberation generation part. Further, in addition to these, a form in which an impulse response of an actual sound field is convolved with the reproduction sound source has also been proposed.

However, in the conventional trans-aural system, a purpose is to strictly control localization, reverberation and sound quality of an original sound field, so that an optimal solution of a filter for canceling characteristics of the reproduction sound field did not necessarily become stable and also when there is a big difference between characteristics of the original sound field and the reproduction sound field, an uncomfortable feeling might remain acoustically. Also, by strictly obtaining characteristics in both of right and left ear positions, realism in the original sound field can be obtained in the case of listening in an optimal position, but even in the case of listening in a position slightly deviating from its point, it became realism quite different from that in the original sound field and a narrow control area became a problem.

Also, in the conventional reverberation addition apparatus, sound addition information, that is, phase, amplitude, reverberation characteristics, etc. were determined and provided uniquely based on know-how of a designer without consideration of characteristics of the reproduction sound field. Because of that, the addition information did not always match with each the reproduction sound field, and also in a form in which sound field data of the reproduction sound field is convolved directly with the reproduction sound source, a long filter was required and it became a large-scale system configuration.

SUMMARY OF THE INVENTION

Therefore, the invention is implemented in view of the problems, and an object of the invention is to provide a method and a system for obtaining reproduction sound with realism similar to that of an original sound field regardless of listening positions by adding sound information to respective reproduction sound fields in correspondence with specific characteristics.

In order to solve the problem, a sound field control method of the invention comprises the steps of measuring reverberation characteristics of a first sound field used as the reference, measuring reverberation characteristics of a second sound field for listening, detecting a difference between the reverberation characteristics of the first sound field and the reverberation characteristics of the second sound field measured, calculating information added to a sound source offered to listening in the second sound field based on the difference between the reverberation characteristics detected, and adding the calculated information to the sound source.

According to the sound field control method of the invention, it is a method of control capable of obtaining realism similar to that of wide listening space also in, for example, narrow listening space in the case of listening to sound. A first sound field used as the reference is, for example, a recording studio or a music hall, and a second sound field corresponds to a room of a listener or the inside of a car. As a factor giving realism, reverberation characteristics of listening space act greatly and the reverberation characteristics of narrow space attenuate faster than those of wide space and when listening to sound recorded in the wide space in the narrow space, an uncomfortable feeling is given.

Therefore, in the invention, it is constructed so that realism similar to that of the case of listening in the first sound field can be obtained by measuring the reverberation characteristics in the first sound field and the reverberation characteristics in the second sound field and detecting a difference between the two reverberation characteristics and obtaining information added to a sound source reproduced in the second sound field based on its difference and adding the information to original sound in the case of reproduction.

Sound waves arriving at a listener include direct sound from a speaker and reflected sound which reflects on a wall, a ceiling, a floor, furniture, etc. of a room and arrives with delay from the direct sound, and the reverberation characteristics are characteristics related to this reflected sound. Reverberation of a wide room is maintained for a long time than reverberation of a narrow room. Therefore, a reflected sound pattern is obtained so as to approximate to the reverberation characteristics in the first sound field from the reverberation characteristics in the first sound field and the reverberation characteristics in the second sound field and is added to the original sound in the case of reproduction.

Incidentally, the first sound field may be set in various state depending on purpose, and a listener can listen in a sound field approximated to environment set.

In order to solve the problem, a sound field control method of the invention comprises the steps of dividing a sound source offered to listening into predetermined frequency bands, measuring reverberation characteristics of a first sound field used as the reference every the divided frequency band, measuring reverberation characteristics of a second sound field for listening every the divided frequency band, detecting a difference between the reverberation characteristics of the first sound field and the reverberation characteristics of the second sound field measured every the divided frequency band, calculating information added to a sound source offered to listening in the second sound field based on the difference between the reverberation characteristics detected every the divided frequency band, adding the calculated information every the frequency band to the sound source, and combining the sound source to which the information is added every the frequency band.

According to the sound field control method of the invention, it is a method of control in which a sound source is divided into predetermined frequency bands and the most effective reflected sound pattern is obtained in the respective frequency bands and is added to the sound source every the frequency band and further all are combined to produce an output in the case of obtaining the reflected sound pattern so as to approximate to the reverberation characteristics in the first sound field as described above from the reverberation characteristics in the first sound field and the reverberation characteristics in the second sound field.

The reverberation characteristics of a high frequency component attenuate rapidly as compared with those of a low frequency component. Therefore, more effective realism can be obtained by obtaining the optimum reflected sound pattern every the frequency band and adding the reflected sound pattern to the sound source.

In one aspect of a sound field control method of the invention, the information added to the sound source is reflected sound information.

According to this aspect, the reflected sound pattern is obtained so that the reverberation characteristics in the second sound field approximate to the reverberation characteristics in the first sound field as described above from the reverberation characteristics in the first sound field and the reverberation characteristics in the second sound field.

In another aspect of a sound field control method of the invention, measurement of the reverberation characteristics is made by driving a speaker by a predetermined signal and collecting a sound wave issued from the speaker by a microphone placed in a predetermined position and analyzing an impulse response between the speaker and the microphone from the predetermined signal and sound information collected by the microphone.

According to this aspect, in measurement of the reverberation characteristics, a predetermined signal is inputted to a speaker and a sound wave is generated from the speaker and its sound wave is collected by a microphone. It can be obtained analyzing an impulse response between the speaker and the microphone from the inputted predetermined signal and a signal collected by the microphone. The microphone is placed in a position corresponding to the head of a listener. A measurement result is recorded on recording means and is used as data in the case of obtaining a reflected sound pattern. As an input signal, for example, an impulse signal, M-sequence noise, a time stretched pulse, etc. are used.

Also, the reverberation characteristics in the respective frequency bands may be obtained using a burst signal with a limited band.

In a further aspect of a sound field control method of the invention, measurement of the reverberation characteristics and calculation of information added to the sound source are made with respect to plural speakers.

According to this aspect, for example, when reproduction is performed using plural speakers in a stereo system, the reverberation characteristics in the first sound field and the second sound field are measured individually with respect to each of the speakers arranged in predetermined places. By obtaining information added to original sound every each the speaker from these reverberation characteristics and adding the addition information, namely a reflected sound pattern in the second sound field and performing reproduction, realism similar to that of the first sound field can be obtained also in stereo reproduction.

In order to solve the problem, a sound field control system of the invention comprises means for measuring reverberation characteristics of a first sound field used as the reference, means for measuring reverberation characteristics of a second sound field for listening, means for detecting a difference between the reverberation characteristics of the first sound field and the reverberation characteristics of the second sound field measured, means for calculating information added to a sound source offered to listening in the second sound field based on the difference between the reverberation characteristics detected, and means for adding the calculated information to the sound source.

According to the sound field control system of the invention, it is a system for performing control so that realism similar to that of wide listening space can be obtained also in, for example, narrow listening space in the case of listening to sound.

Means for measuring reverberation characteristics of a first sound field and means for measuring reverberation characteristics of a second sound field are means for measuring the reverberation characteristics in the respective sound fields, and the same configurations are used in the configuration. When a different configuration is used, it is necessary to correct measurement standards between their means.

Means for detecting a difference between the reverberation characteristics detects its difference from measurement results of the reverberation characteristics in the first sound field and the reverberation characteristics in the second sound field. Means for calculating information added to a sound source obtains the information added to the sound source reproduced in the second sound field, namely a reflected sound pattern from the difference between the two reverberation characteristics. Also, means for adding information adds its information to original sound in the case of reproducing the original sound in the second sound field. By these means, realism similar to that of the case of listening in the first sound field can be obtained also in the second sound field.

In order to solve the problem, a sound field control system of the invention comprises means for dividing a sound source offered to listening into predetermined frequency bands, means for measuring reverberation characteristics of a first sound field used as the reference every the divided frequency band, means for measuring reverberation characteristics of a second sound field for listening every the divided frequency band, means for detecting a difference between the reverberation characteristics of the first sound field and the reverberation characteristics of the second sound field-measured every the divided frequency band, means for calculating information added to a sound source offered to listening in the second sound field based on the difference between the reverberation characteristics detected every the divided frequency band, means for adding the calculated information every the frequency band to the sound source, and means for combining the sound source to which the information is added every the frequency band.

According to the sound field control system of the invention, it is a system of a configuration in which a sound source is divided into predetermined frequency bands and the most effective reflected sound pattern is obtained in the respective frequency bands and is added to the sound source every the frequency band and further all are combined to produce an output in the case of obtaining the reflected sound pattern so as to approximate to the reverberation characteristics in the first sound field as described above from the reverberation characteristics in the first sound field and the reverberation characteristics in the second sound field.

Means for making a division into frequency bands divides the frequency bands by a predetermined band width in order to obtain information added to the sound source every the predetermined frequency band in the case of reproduction in the second sound field from the reverberation characteristics in the first sound field and the reverberation characteristics in the second sound field.

Also, means for measuring the reverberation characteristics of the first sound field and means for measuring the reverberation characteristics of the second sound field are means for measuring the reverberation characteristics in the respective sound fields, and the same configurations are used in the configuration. When a different configuration is used, it is necessary to correct measurement standards between their means.

Means for detecting a difference between the reverberation characteristics detects its difference from measurement results of the reverberation characteristics every the frequency band in the first sound field and the second sound field. Means for calculating information added to a sound source obtains the information added to the sound source reproduced in the second sound field, namely a reflected sound pattern every the frequency band from the difference between the two reverberation characteristics. Also, means for adding information adds its information to original sound every the frequency band in the case of reproducing the original sound in the second sound field. Further, means for combining the sound source combines the sound source to which the reflected sound pattern is added every these frequency bands and produces an output.

In one aspect of a sound field control system of the invention, there is provided means for adjusting a gain every the divided frequency band.

According to this aspect, a level can be adjusted every the divided frequency band, so that frequency characteristics can be adjusted easily.

In another aspect of a sound field control system of the invention, it is constructed using a filter having a transfer function matching with a transfer function between input and output of a signal instead of the means for dividing the frequency bands, the means for adding the information to the sound source, the means for adjusting the gain and the means for combining the sound source.

According to this aspect, by passing a sound source of a reproduction sound field into one filter having a transfer function matching with a transfer function between input and output of a signal of the system configuration described above, desired reverberation characteristics can be added to the sound source and the system becomes simple. However, the transfer function needs to be obtained previously according to combinations of the first sound field and the second sound field.

In a further aspect of a sound field control system of the invention, in each of the frequency bands, instead of the means for dividing the frequency bands, the means for adding the information to the sound source and the means for adjusting the gain, it is constructed using a filter having a transfer function matching with a transfer function between input and output of a signal through each of these means.

According to this aspect, the means for dividing the frequency bands, the means for adding the information to the sound source and the means for adjusting the gain are constructed by a filter having a transfer function matching with a transfer function between input and output of a signal. Adjustment can be made every the divided band.

In a further aspect of a sound field control system of the invention, the means for measuring the reverberation characteristics comprises a speaker, generation means of a predetermined signal inputted to said speaker, a microphone for collecting a sound wave issued from the speaker, and means for analyzing an impulse response between the speaker and the microphone from the predetermined signal and sound information collected by the microphone.

According to this aspect, a predetermined signal is inputted to a speaker and a sound wave for reverberation characteristic measurement is issued from the speaker. A microphone collects the sound wave issued from the speaker, and means for analyzing sound information analyzes an impulse response between the speaker and the microphone from the predetermined signal and the sound wave collected by the microphone and obtains the reverberation characteristics. Further, the obtained reverberation characteristics are recorded on a recorder as data for generating a reflected sound pattern added in the second sound field.

Such action and other advantages of the invention will become apparent from the following embodiments described.

DETAILED DESCRIPTION OF THE PREFERRED EMBODIMENTS

First, a measuring system of reverberation characteristics and a feature of the reverberation characteristics by a sound field and a frequency band will be described with reference to FIGS. 1 to 3. Here, the reverberation characteristics relate to characteristics of, for example, sound reflected and transmitted in a wall, a ceiling, a floor, etc. of a sound field in addition to direct sound of the case that sound issued from a speaker is transmitted to a listener in a sound field at the time of listening to music, and have an influence on realism of the listener. A specific feature is had by a width of the sound field or a frequency band.

Figure 1:
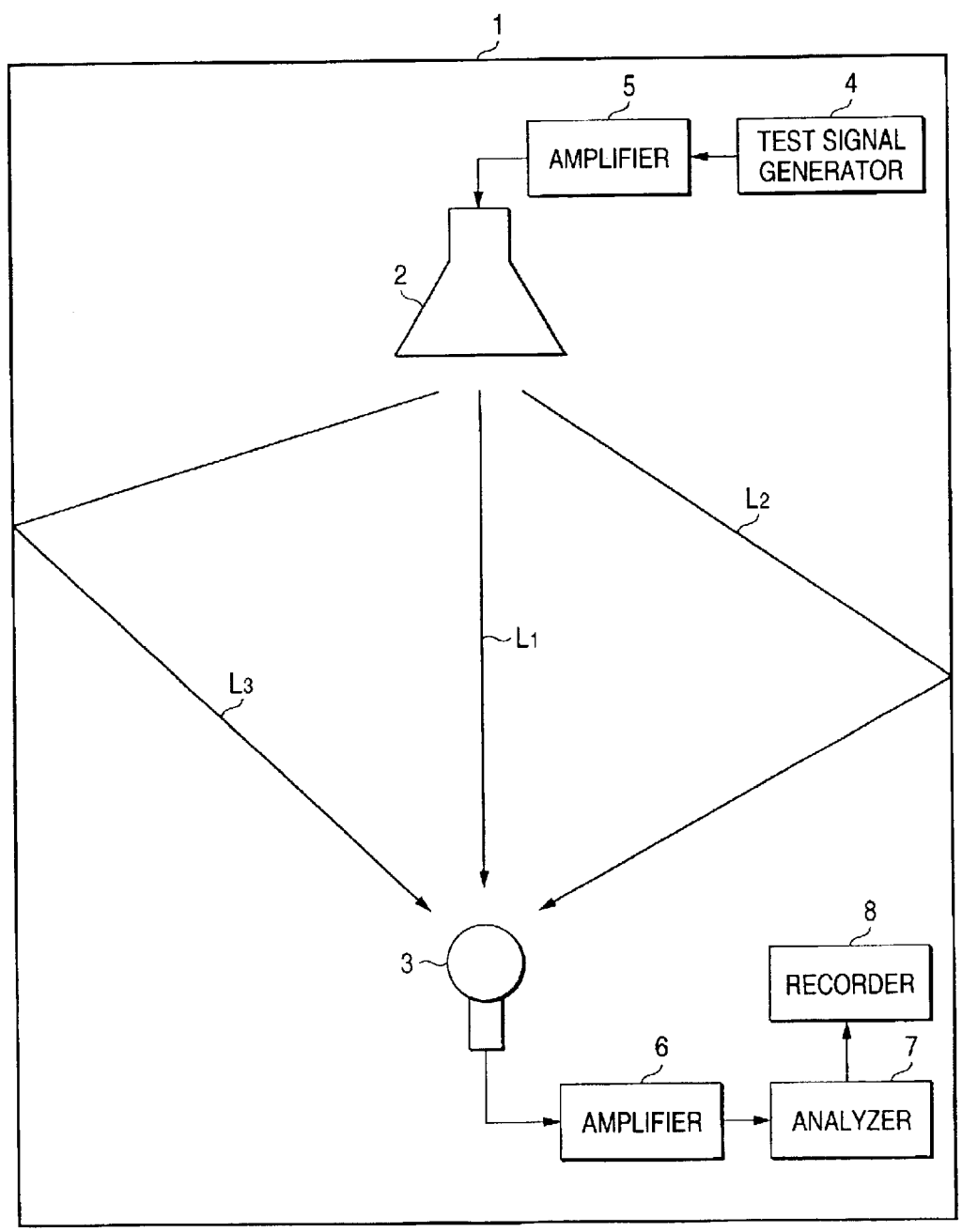
FIG. 1 is a diagram showing a measuring system for measuring reverberation characteristics of a sound field in a sound field control method and a sound field control system of the present invention.
Figure 2A:
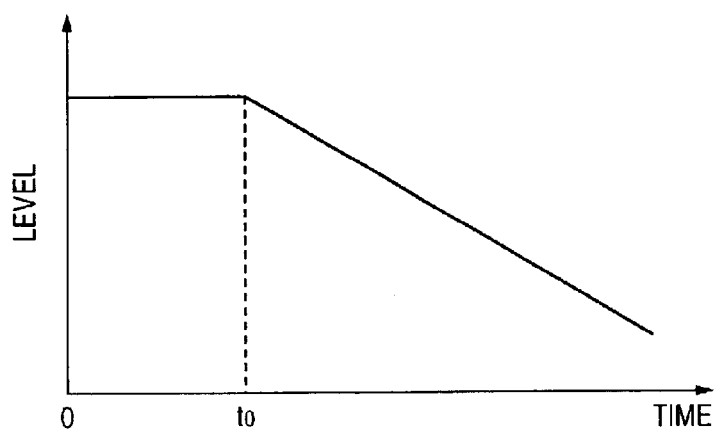
FIGS. 2A and 2B are graphs showing the reverberation characteristics and FIG. 2A is one example of the reverberation characteristics in a wide sound field and FIG. 2B is one example of the reverberation characteristics in a narrow sound field.
Figure 2B:
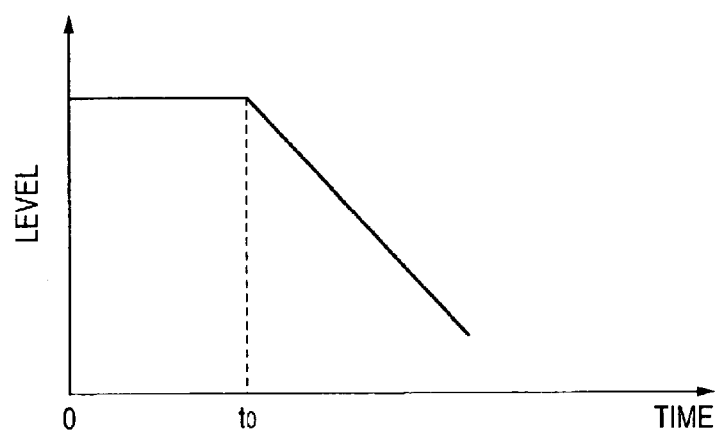
Figure 3A:
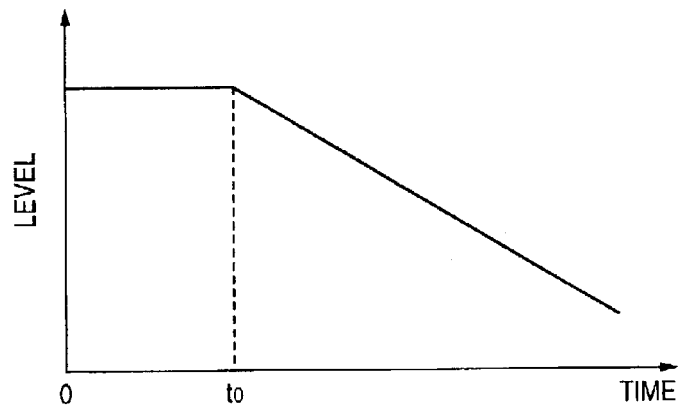
FIGS. 3A and 3B are diagrams showing the reverberation characteristics and FIG. 3A is one example of the reverberation characteristics at a low frequency and FIG. 3B is one example of the reverberation characteristics at a high frequency.
Figure 3B:
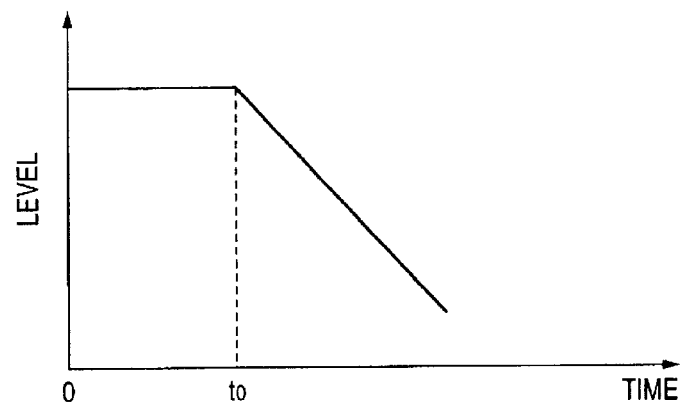

Incidentally, FIG. 1 is a diagram showing a measuring system for measuring reverberation characteristics of a sound field in a sound field control method and a sound field control system of the invention, and also FIGS. 2A and 2B are graphs showing the measured reverberation characteristics, and FIG. 2A is one example of the reverberation characteristics in a wide sound field, and FIG. 2B is one example of the reverberation characteristics in a narrow sound field. Also, FIGS. 3A and 3B are graphs showing the reverberation characteristics, and FIG. 3A is one example of the reverberation characteristics at a low frequency, and FIG. 3B is one example of the reverberation characteristics at a high frequency.

As shown in FIG. 1, the measuring system of the reverberation characteristics is constructed by comprising, for example, a speaker 2 for issuing signal sound for measurement, a microphone 3 provided in a position at a predetermined distance from the speaker 2, a test signal generator 4 for generating a signal for driving the speaker 2, an amplifier 5 for driving the speaker 2, an amplifier 6 for adjusting a level of sound received by the microphone 3, an analyzer 7 for obtaining the reverberation characteristics by analyzing an impulse response from a signal of the test signal generator 4 and a sound wave signal collected by the microphone 3, and a recorder 8 for recording the obtained reverberation characteristics in a sound field 1. Further, it may comprise control means such as a personal computer for controlling the system.

In measurement of the reverberation characteristics by this measuring system, a signal from the test signal generator 4, for example, an impulse signal, M-sequence noise, a time stretched pulse, etc. is adjusted to a predetermined level by the amplifier 5 and its output is inputted to the speaker 2 and driving is performed and a sound wave is generated inside the sound field 1. The sound wave issued inside the sound field 1 is collected by the microphone 3. The microphone 3 is placed in the front of the speaker 2 in a position corresponding to the head of the case that a listener listens to music. Sounds from the speaker 2 include a sound arriving at the microphone 3 directly as shown by numeral L1 and a sound arriving at it after reflecting on a wall, a ceiling, a floor, etc. of the sound field 1 as shown by numerals L2, L3, and these show a feature of reverberation sound.

A signal of the sound wave collected by the microphone 3 is changed to a predetermined level by the amplifier 6 and is inputted to the analyzer 7 and the reverberation characteristics are measured. The obtained reverberation characteristics are recorded on the recorder 8 and are used as data of comparison with other sound field or correction of the reverberation characteristics.

Also, in the case of reproducing plural speakers in a predetermined position like a stereo apparatus, reverberation characteristics are measured individually with respect to the respective speakers and the reverberation characteristics corresponding to the respective speakers are corrected at the time of reproducing. Incidentally, a personal computer equipped with a measuring program may be used instead of the analyzer 7 or the recorder 8. Also, this personal computer may be offered to control of the whole measuring system.

Next, with respect to a relation between width of the sound field 1 and the reverberation characteristics, FIG. 2A is one example of the reverberation characteristics in a wide sound field 1 and FIG. 2B is one example of the reverberation characteristics in a narrow sound field 1, and a range to time $t_0$ is an energy integral value of a total of direct sound and reflected sound arriving at the microphone 3 and a range after time $t_0$ is an energy integral value by the reflected sound. As shown in these drawings, in the narrow sound field 1, attenuation of the energy integral value by the reflected sound is fast as compared with the wide sound field 1.

Also, with respect to the reverberation characteristics by a frequency band, FIG. 3A is one example of the reverberation characteristics at a low frequency and FIG. 3B is one example of the reverberation characteristics at a high frequency, and a range to time $t_0$ is an energy integral value of a total of direct sound and reflected sound arriving at the microphone 3 and a range after time $t_0$ is an energy integral value by the reflected sound. As shown in these drawings, at the high frequency, attenuation of the energy integral value by the reflected sound is fast as compared with the low frequency.

As described above, the reverberation characteristics vary depending on conditions of the sound field for reproducing sound or frequency bands, and realism by effect of the reflected sound varies depending on environment in which a listener listens to music. Therefore, the invention is designed so that based on these factors, information about the reflected sound is added to reproduction sound according to the reverberation characteristics of a reproduction sound field and the reproduction sound close to ideal realism of an original sound field is obtained.

Figure 5:
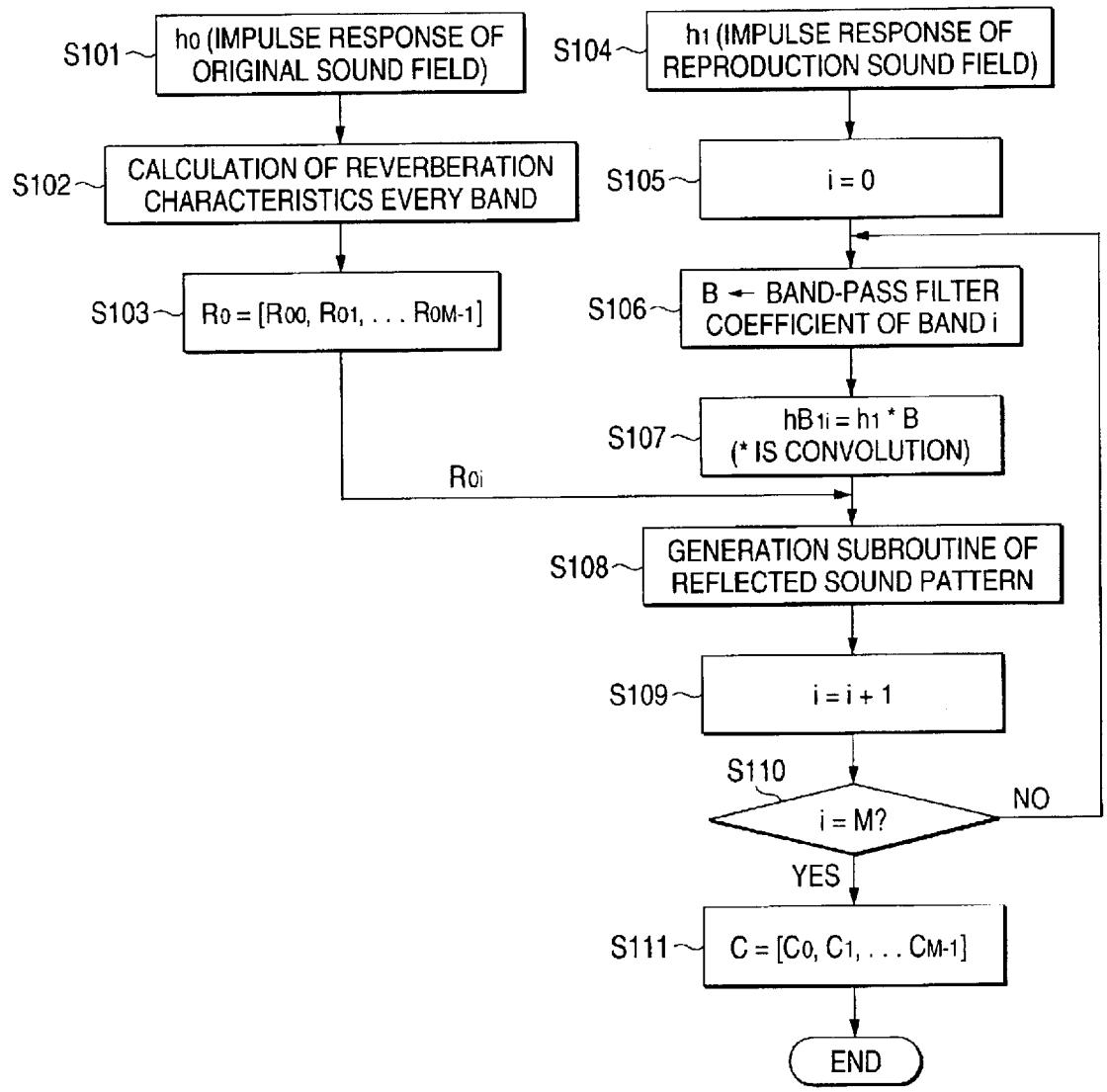
FIG. 5 is a flowchart showing a flow of generation of a reflected sound pattern added.
Figure 6:
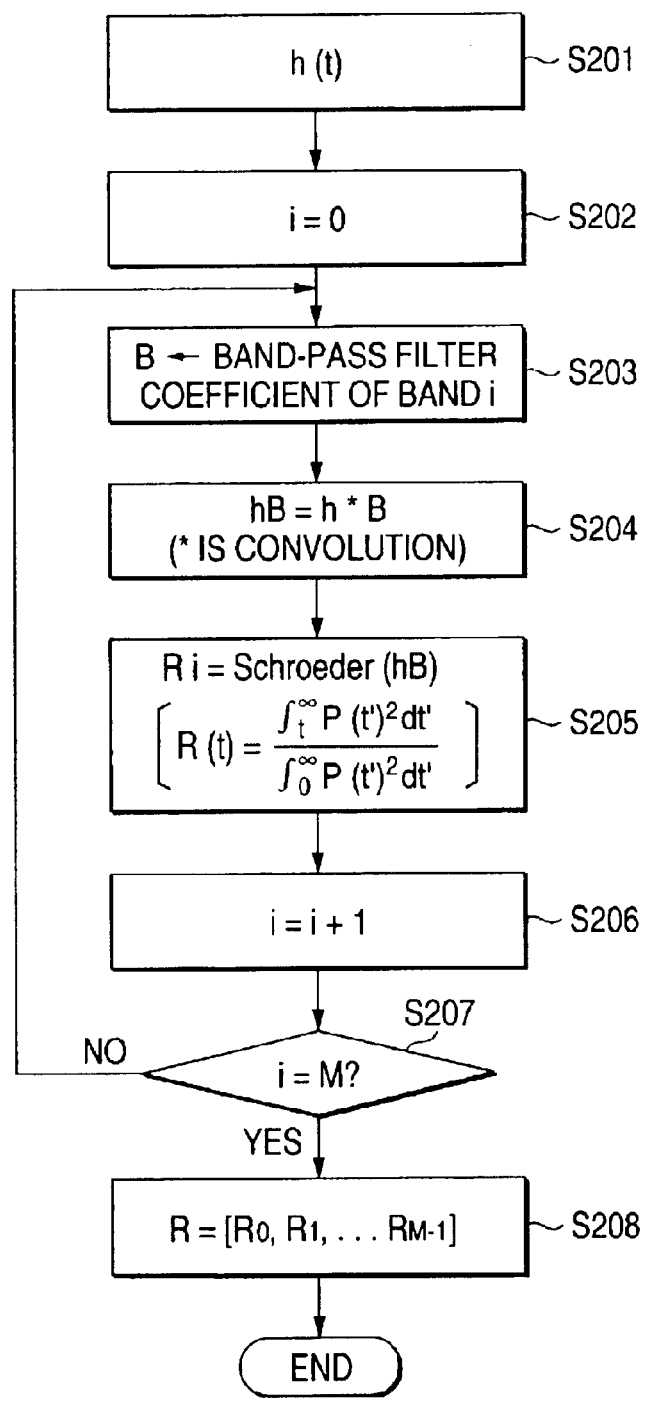
FIG. 6 is a flowchart showing a flow of calculation of reverberation characteristics every frequency band.
Figure 7:
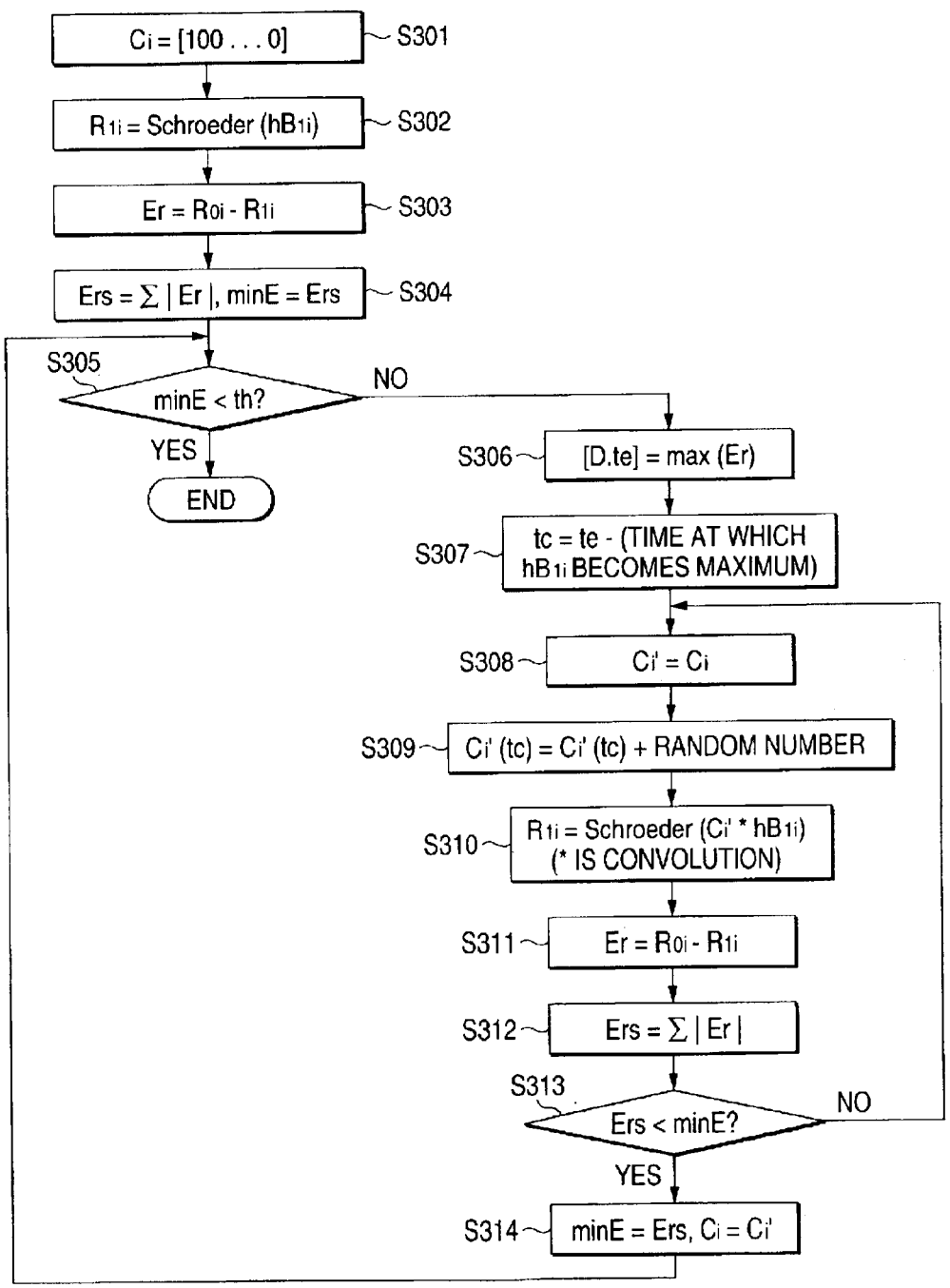
FIG. 7 is a flowchart showing a flow of a generation subroutine in generation of the reflected sound pattern shown in FIG. 5.

Next, a case of making a division into predetermined frequency bands with respect to addition information for obtaining reproduction sound close to realism of an original sound field, namely generation of a reflected sound pattern will be described with reference to FIGS. 4 to 7. Incidentally, FIG. 4 is a diagram showing correction of reverberation characteristics of a sound field, and FIG. 5 is a flowchart showing a flow of generation of a reflected sound pattern added, and FIG. 6 is a flowchart showing a flow of calculation of reverberation characteristics every band, and FIG. 7 is a flowchart showing a flow of a generation subroutine in generation of the reflected sound pattern shown in FIG. 5.

Figure 4:
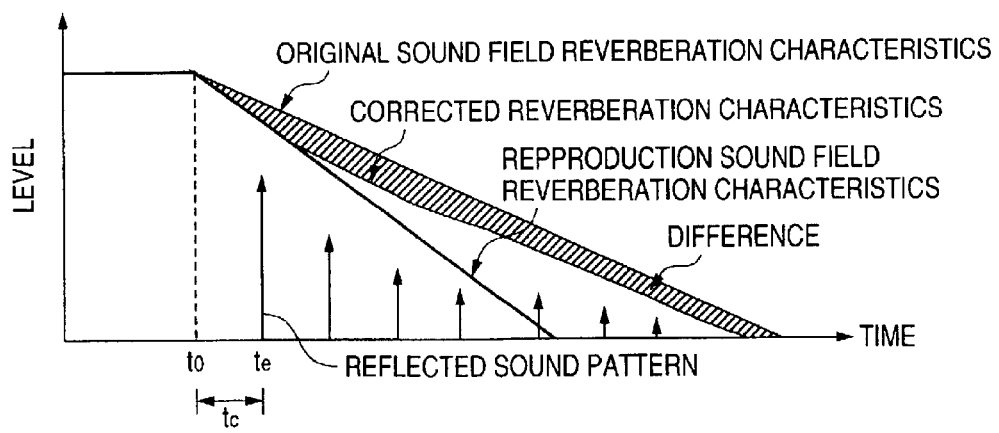
FIG. 4 is a diagram showing correction of reverberation characteristics of a reproduction sound field.

As shown in FIG. 4, in reproduction sound field reverberation characteristics in a narrow room, reverberation attenuates in a short time as compared with original sound field reverberation characteristics. In order to approximate this attenuation to the reverberation characteristics in an original sound field, a first reflected sound pattern is added at time te after a lapse of predetermined time tc from time $t_0$ at which direct sound has arrived and sequentially, reflected sound patterns every frequency band are added. A level of the reflected sound pattern is determined so that a difference between the reproduction sound field reverberation characteristics and the original sound field reverberation characteristics becomes smaller than a predetermined value. By adding this reflected sound pattern to a sound source reproduced, realism similar to that of the original sound field can be obtained.

Next, a flow of generation of the reflected sound pattern will be described. As shown in FIG. 5, first, an impulse response $h_0$ in an original sound field is measured. This is measured in a sound field such as a music hall in which desired realism can be obtained by the system shown in FIG. 1 (step 101). Next, reverberation characteristics every frequency band in its sound field are calculated (step 102). This calculation will be described below with reference to FIG. 6. As a result of this, reverberation characteristics $R_0$ every band (M) obtained are recorded and are offered to generation of the reflected sound pattern of step 108 (step 103). By the above, data of the reverberation characteristics of the target original sound field is obtained.

Then, an impulse response $h_1$ in a reproduction sound field is measured (step 104). This is also measured in a sound field reproduced by the system shown in FIG. 1. It is assumed that the number of bands is divided into M bands in a manner similar to that of the original sound field, and initialization for obtaining a reflected sound pattern about the first band is performed (step 105). In the bands divided herein, for example, a center frequency is divided into nine bands of 63, 125, 250, 500, 1 k, 2 k, 4 k, 8 k, 16 kHz.

Then, a coefficient of a band-pass filter of the i-th band is set to B (step 106), and convolution calculation of the impulse response of the reproduction sound field and the band-pass filter is performed (step 107). Then, a reflected sound pattern C is obtained from the impulse response $h_0$ of the original sound field obtained previously (step 108). Calculation of this reflected sound pattern will be described below with reference to FIG. 7.

Thereafter, it is set to the next band (step 109), and it is determined whether or not calculation of the reflected sound pattern has been performed with respect to all the bands (step 110) and when there is still the band to be calculated, the flow returns to step 106 and a reflected sound pattern about the next band is calculated. On the other hand, when the reflected sound patterns are obtained with respect to all the bands (step 111), the flow is ended. By adding the reflected sound patterns obtained in this manner to the original sound at the time of reproduction, for example, it can listen to music with realism of a target sound field, namely the original sound field.

Next, calculation of reverberation characteristics every band will be described with reference to FIG. 6. An impulse response of a reproduction sound field is obtained previously (step 201).

First, it is assumed that a frequency band is divided into M bands, and calculation is set to the first band (step 202). Next, a coefficient of a band-pass filter is set to B (step 203), and convolution calculation of an impulse response of an original sound field and the band-pass filter is performed (step 204). Then, reverberation attenuation characteristics are calculated using a reverberation integral expression proposed by Schroeder which is generally called "Schroeder's reverberation integral expression" (step 205).

Thereafter, it is set to the next band (step 206), and it is determined whether or not calculation of the reverberation attenuation characteristics has been performed with respect to all the bands (step 207) and when there is still the band to be calculated, the flow returns to step 203 and reverberation attenuation characteristics about the next band are calculated. On the other hand, when the reverberation attenuation characteristics are obtained with respect to all the bands (step 208), the flow is ended. Here, step 208 corresponds to step 103.

Next, calculation of a reflected sound pattern will be described with reference to FIG. 7. First, an initial state of a reflected sound pattern is set (step 301). Next, reverberation characteristics of a reproduction sound field are calculated (step 302), and a difference between an original sound field and there production sound field in the reverberation characteristics is calculated (step 303). Here, a sum of the differences in the reverberation characteristics in all the bands of the original sound field and the reproduction sound field is set to Ers (step 304). It is determined whether or not this Ers is smaller than a reference difference th set (step 305) and when it is smaller, generation of the reflected sound pattern is ended.

When it is not smaller, time te at which the maximum value of the amount of error is taken is calculated (step 306), and time at which a result of convolution calculation of an impulse response of the reproduction sound field and a band-pass filter becomes maximum is subtracted from the time te and it is set to time tc (step 307), and a reflected sound pattern Ci is set at this time tc (step 308). Further, a random number is added to the reflected sound pattern Ci (step 309), and attenuation characteristics of a band i are calculated by a reverberation integral expression of Schroeder (step 310).

Then, a difference in the attenuation characteristics in a frequency band i of the original sound field and the reproduction sound field is obtained (step 311). These differences are sequentially summed (step 312), and it is determined whether or not its value is smaller than an error obtained in step 304 (step 313). When it is not smaller, the flow returns to step 308, and the following calculation is performed similarly using a random number newly generated in step 309. When it is smaller, the error minimum value and the reflected sound pattern Ci are set and the flow returns to step 305 and it is again determined whether or not the error minimum value is smaller than a set value. When it is smaller, calculation of the reflected sound pattern is ended and according to the flowchart of FIG. 5, the reflected sound pattern of each the frequency band is decided and is superimposed on the reproduction sound.

As described above, sound capable of obtaining realism similar to that of the original sound field can be obtained in the reproduction sound field. Incidentally, a generation method of the reflected sound pattern is not limited to the method described above. As long as there is a method capable of obtaining the reflected sound pattern to be added to the reproduction sound from a difference between the original sound field and the reproduction sound field in the reverberation characteristics, any method can also be used.

(First Embodiment According to Sound Field Control Method)

Figure 8:
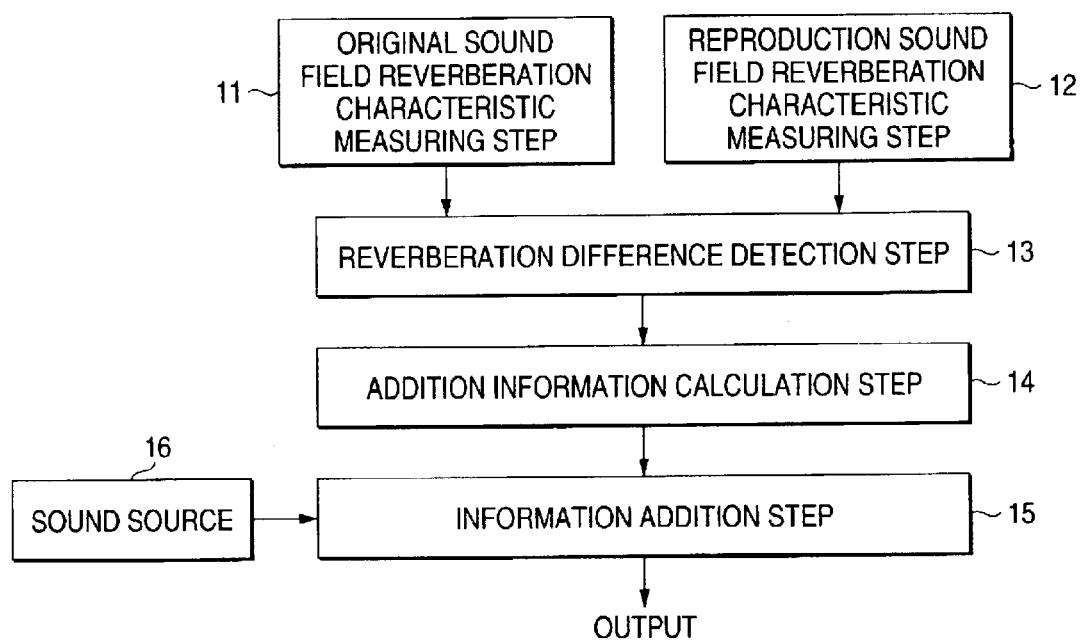
FIG. 8 is a diagram showing a first embodiment in a sound field control method of the invention.

A first embodiment of a sound field control method of the invention will be described with reference to FIG. 8. Steps of the sound field control method of the embodiment comprise an original sound field reverberation characteristic measuring step 11, a reproduction sound field reverberation characteristic measuring step 12, a reverberation difference detection step 13, an addition information calculation step 14, and an information addition step 15.

The original sound field reverberation characteristic measuring step 11 is a step of measuring reverberation characteristics of an original sound field, and is a step of inputting a signal for measurement, for example, an impulse signal to a speaker and outputting the signal as a sound wave and collecting its sound wave by a microphone placed in a predetermined position of the front of the speaker and analyzing the collected signal by an analyzer as described with reference to FIG. 1. The microphone is set in a position corresponding to the head of the case that a listener listens. As an original sound field, a recording studio or a music hall can be assumed. Also, it can be set to a sound field of listener's pleasure.

The impulse signal includes all the frequency components in principle, and transfer functions of transfer paths of the sound wave including characteristics of the speaker and the microphone can be measured at once. As the transfer paths of the sound wave, there are direct sound from the speaker to the microphone and reflected sound which is reflected and transmitted in a wall, a ceiling, a floor, furniture, etc. of a sound field, and these form reverberation characteristics specific to the sound field. The measured reverberation characteristics are recorded on a recorder, and are compared with reverberation characteristics of a reproduction sound field, and it is offered to calculation of addition information to reproduction sound, namely a reflected sound pattern. Also, M-sequence noise or a time stretched pulse can be used instead of the impulse signal.

The reproduction sound field reverberation characteristic measuring step 12 measures reverberation characteristics of a reproduction sound field in a manner similar to the original sound field reverberation characteristic measuring step 11. A reproduction sound field is, for example, one room of a listener's home or seat space of a car. The reproduction sound field is generally space narrower than the original sound field, and in the narrower space, the reverberation characteristics attenuate rapidly. The obtained reverberation characteristics are compared with the reverberation characteristics of the original sound field and are offered to calculation of the reflected sound pattern so as to approximate to the reverberation characteristics of the original sound field.

The reverberation difference detection step 13 detects a difference between the reverberation characteristics of the original sound field and the reproduction sound field measured as described above. This difference becomes a difference of realism in the original sound field and the reproduction sound field and a listener feels.

The addition information calculation step 14 is a step of obtaining addition information capable of obtaining realism similar to that of the original sound field, that is, a reflected sound pattern added to a reproduction sound source 16 of the reproduction sound field based on the difference between the reverberation characteristics of the original sound field and the reproduction sound field obtained in the reverberation difference detection step 13.

The information addition step 15 is a step of adding the reflected sound pattern obtained in the addition information calculation step 14 to the sound source 16 and producing an output. An output signal is inputted to the speaker through an amplifier and is issued as a sound signal or is recorded on a record medium such as a disk. When the output signal is recorded on the disk and is reproduced, in the case of reproducing it, a normal sound reproducing apparatus can be used and realism similar to that of the original sound field can be obtained.

Incidentally, in a sound system using plural speakers of a stereo, it is necessary to measure reverberation characteristics every speaker and obtain a reflected sound pattern.

(Second Embodiment According to Sound Field Control Method)

Figure 9:
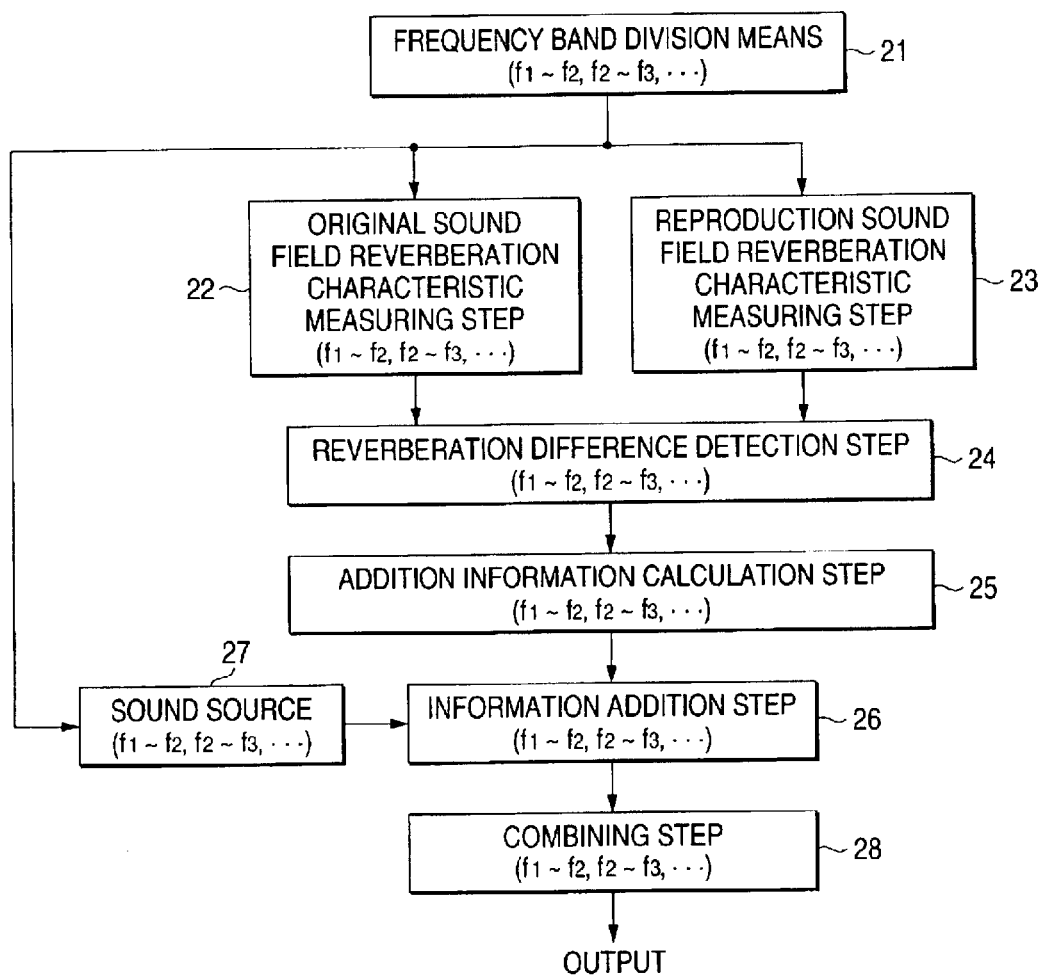
FIG. 9 is a diagram showing a second embodiment in the sound field control method of the invention.

A second embodiment of a sound field control method of the invention will be described with reference to FIG. 9. Steps of the sound field control method of the embodiment comprise a frequency band division step 21, an original sound field reverberation characteristic measuring step 22, a reproduction sound field reverberation characteristic measuring step 23, a reverberation difference detection step 24, an addition information calculation step 25, an information addition step 26, and a combining step 28.

The frequency band division step 21 is a step of dividing sound into predetermined frequency bands (f1 to f2; f2 to f3), . . . ). Reverberation characteristics vary depending on frequency bands, and the reverberation characteristics of a high frequency attenuate rapidly as compared with those of a low frequency. Therefore, the division into the predetermined frequency bands is made and a reflected sound pattern is generated every each the frequency band and is added to a sound source 27. In the division, for example, it is considered that a center frequency is divided into nine bands of 63, 125, 250, 500, 1 k, 2 k, 4 k, 8 k, 16 kHz.

The original sound field reverberation characteristic measuring step 22, the reproduction sound field reverberation characteristic measuring step 23, the reverberation difference detection step 24, the addition information calculation step 25 and the information addition step 26 differ from those of the first embodiment only in acting every the divided frequency band, and the other functions and action are equal to those of the first embodiment.

The combining step 28 is a step of combining and outputting a signal in which the reflected sound pattern is added to the sound source 27 every the frequency band, and reproduction sound to which the reflected sound pattern is added is reconstructed and outputted. The fact that an output signal is inputted to a speaker through an amplifier and is issued as a sound signal or is recorded on a record medium such as a disk is also similar to that of the first embodiment.

(First Embodiment According to Sound Field Control System)

Figure 10:
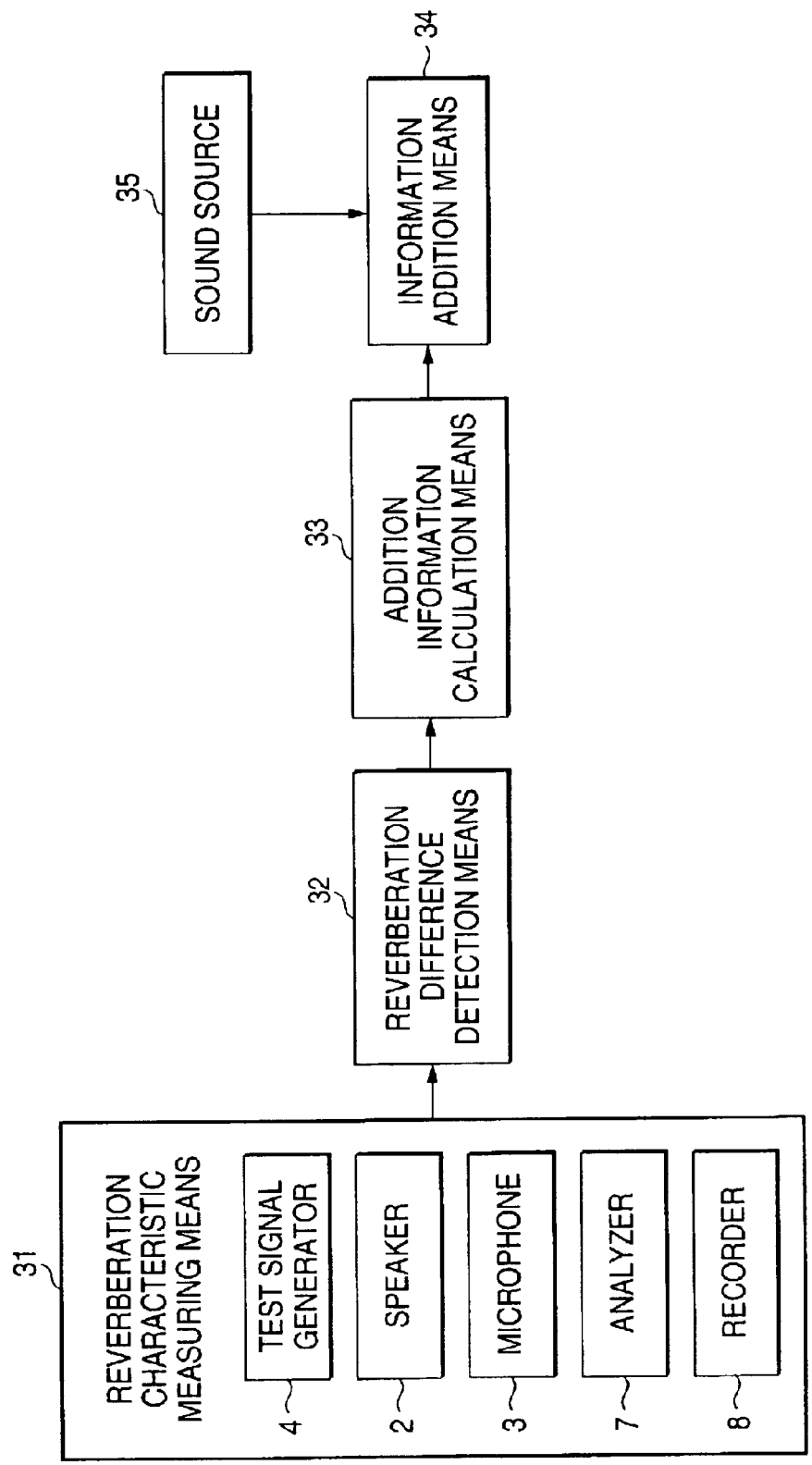
FIG. 10 is a diagram showing a first embodiment in a sound field control system of the invention.

A first embodiment of a sound field control system of the invention will be described with reference to FIG. 10. A configuration of the embodiment comprises reverberation characteristic measuring means 31 including a speaker 2, a microphone 3, a test signal generator 4, an analyzer 7 and a recorder 8, reverberation difference detection means 32, addition information calculation means 33, and information addition means 34.

The reverberation characteristic measuring means 31 is means for measuring reverberation characteristics of an original sound field and a reproduction sound field, and comprises a speaker 2, a test signal generator 4 for generating a signal for measurement inputted to the speaker 2, for example, an impulse signal, a microphone 3 for collecting a sound wave issued from the speaker 2, an analyzer 7 for obtaining the reverberation characteristics by analyzing an impulse response between the speaker 2 and the microphone 3 from the sound wave collected by the microphone 3, and a recorder 8 for recording data of the reverberation characteristics as described with reference to FIG. 1. It may further comprise an amplifier for adjusting a signal level inputted to the speaker 2 or a level of a signal collected by the microphone 3.

The speaker 2 is driven by the impulse signal from the test signal generator 4 and an output is produced as a sound wave and its sound wave is collected by the microphone 3 placed in a predetermined position of the front of the speaker 2 and from the collected signal, the reverberation characteristics are obtained by the analyzer 7. The microphone 3 is set in a position corresponding to the head of the case that a listener listens.

The reverberation difference detection means 32 is means for detecting a difference between the reverberation characteristics from the reverberation characteristics of the original sound field and the reproduction sound field measured by the reverberation characteristic measuring means 31.

The addition information calculation means 33 is means for obtaining addition information capable of obtaining realism similar to that of the original sound field, that is, a reflected sound pattern added to a reproduction sound source 35 of the reproduction sound field based on the difference between the reverberation characteristics of the original sound field and the reproduction sound field obtained by the reverberation difference detection means 32.

The information addition means 34 is means for adding the reflected sound pattern obtained by the addition information calculation means 33 to the sound source 35 and producing an output. An output signal is inputted to the speaker through an amplifier and is issued as a sound signal or is recorded on a record medium such as a disk. In the system configuration described above, sound reproduction in the reproduction sound field can be performed in a state close to environment in the original sound field.

Incidentally, the fact that M-sequence noise or a time stretched pulse can also be used instead of the impulse signal is similar to the above fact.

(Second Embodiment According to Sound Field Control System)

Figure 11:
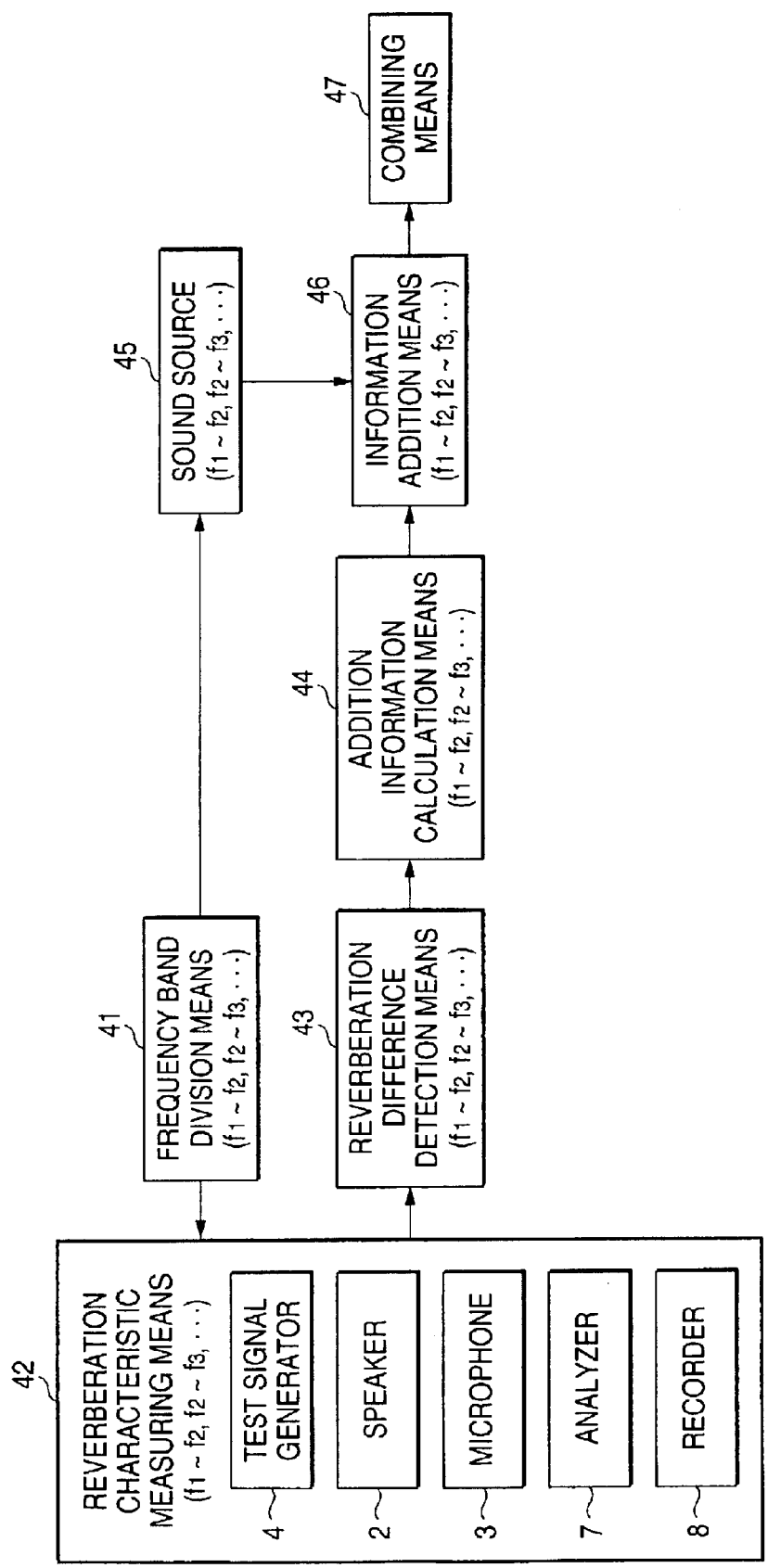
FIG. 11 is a diagram showing a second embodiment in the sound field control system of the invention.

A second embodiment of a sound field control system of the invention will be described with reference to FIG. 11. A configuration of the embodiment comprises frequency band division means 41, reverberation characteristic measuring means 42, reverberation difference detection means 43, addition information calculation means 44, information addition means 46, and combining means 47.

The frequency band division means 41 is means for dividing sound into predetermined frequency bands (f1 to f2, f2 to f3, . . .). Reverberation characteristics vary depending on frequency bands, and the reverberation characteristics of a high frequency attenuate rapidly as compared with those of a low frequency. Therefore, the division into the predetermined frequency bands is made in order to generate a reflected sound pattern every the frequency band and add it to a sound source 45. In a manner similar to the above in the division, for example, it is considered that a center frequency is divided into nine bands of 63, 125, 250, 500, 1 k, 2 k, 4 k, 8 k, 16 kHz.

The reverberation characteristic measuring means 42, the reverberation difference detection means 43, the addition information calculation means 44 and the information addition means 46 differ from those of the first embodiment only in acting every the divided frequency band, and the other functions and action are equal to those of the first embodiment.

The combining means 47 is a step of combining and outputting a signal in which the reflected sound pattern is added to the sound source 45 every the frequency band, and is means for reconstructing reproduction sound to which the reflected sound pattern is added. The fact that an output signal is inputted to a speaker through an amplifier and is issued as a sound signal or is recorded on a record medium such as a disk is also similar to that of the first embodiment.

(First Modified Example According to Sound Field Control System)

Figure 12:
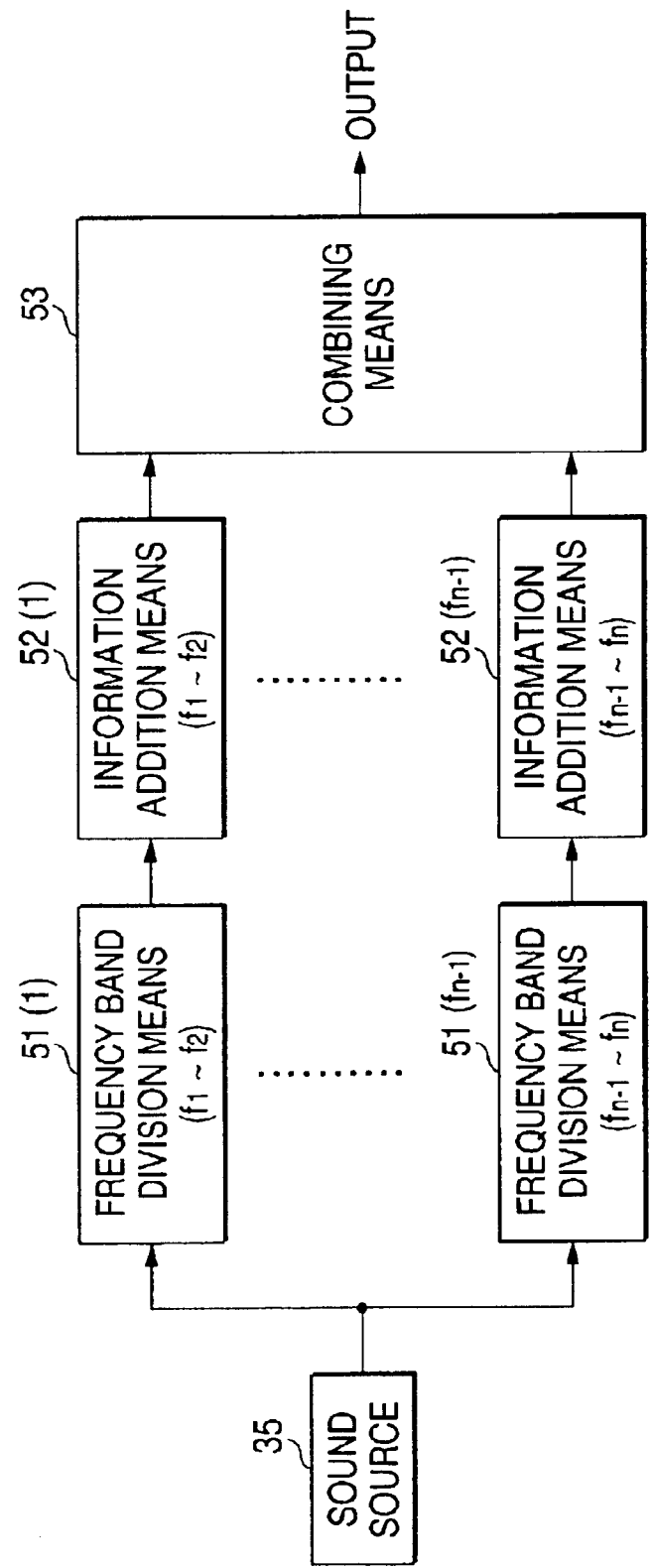
FIG. 12 is a diagram showing a first modified example in the sound field control system of the invention.

Next, a first modified example of a sound field control system of the invention will be described with reference to FIG. 12. The modified example has a system configuration in which a signal from a sound source 35 is inputted to frequency band division means 51 corresponding to divided frequency bands, that is, band-pass filters and addition information, that is, a reflected sound pattern is added to a signal of a passing frequency by information addition means 52 and thereafter a corrected sound signal of each the frequency band is combined by combining means 53 to produce an output. The reflected sound pattern added by the information addition means 52 needs to be obtained previously with respect to the respective frequency bands by the procedure described with reference to FIGS. 4 to 7. In the case that an original sound field and a reproduction sound field are fixed always, the reflected sound pattern may be obtained once and a system configuration is also simple.

Incidentally, the frequency band division means 51 and the information addition means 52 can be replaced backward and forward with respect to an input signal.

(Second Modified Example According to Sound Field Control System)

Figure 13:
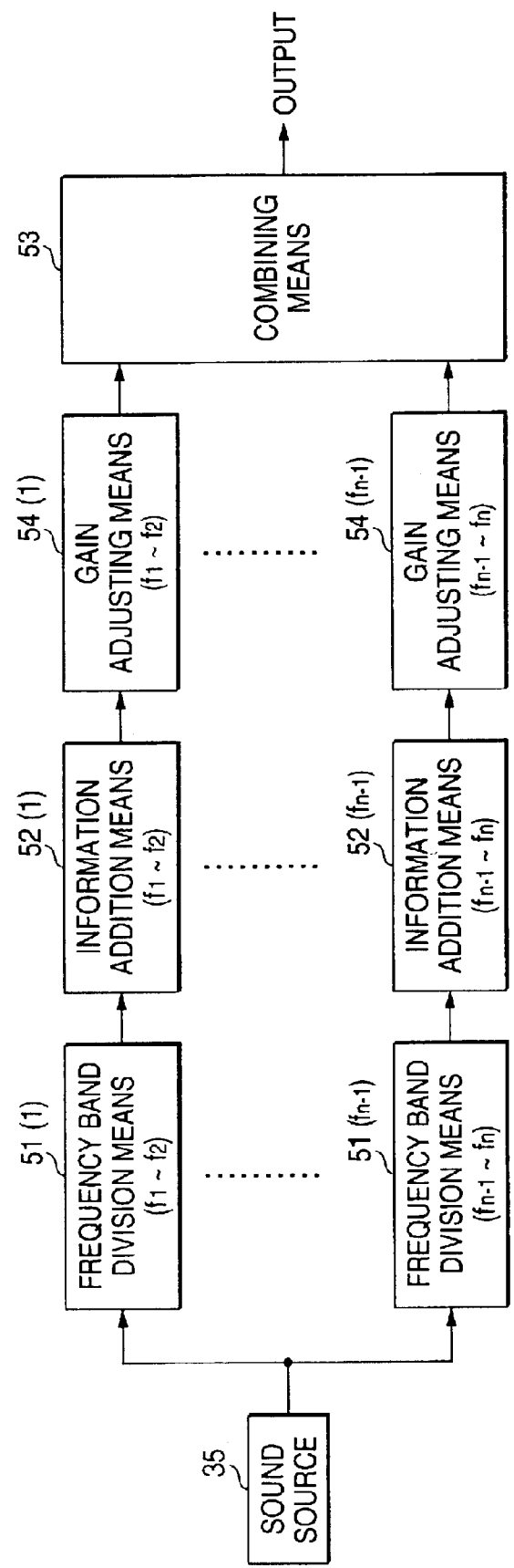
FIG. 13 is a diagram showing a second modified example in the sound field control system of the invention.

Next, a second modified example of a sound field control system of the invention will be described with reference to FIG. 13. In the modified example, gain adjusting means 54 are respectively provided in the back stage of the information addition means 52 shown in the first modified example. After adding reflected sound patterns to respective sound signals of frequency bands, a level of the signal can be adjusted every frequency band and it is easy to adjust frequency characteristics over all the frequency bands. Also, in a manner similar to the first modified example, the frequency band division means 51 and the information addition means 52 can be replaced backward and forward with respect to an input signal.

(Third Modified Example According to Sound Field Control System)

Figure 14:
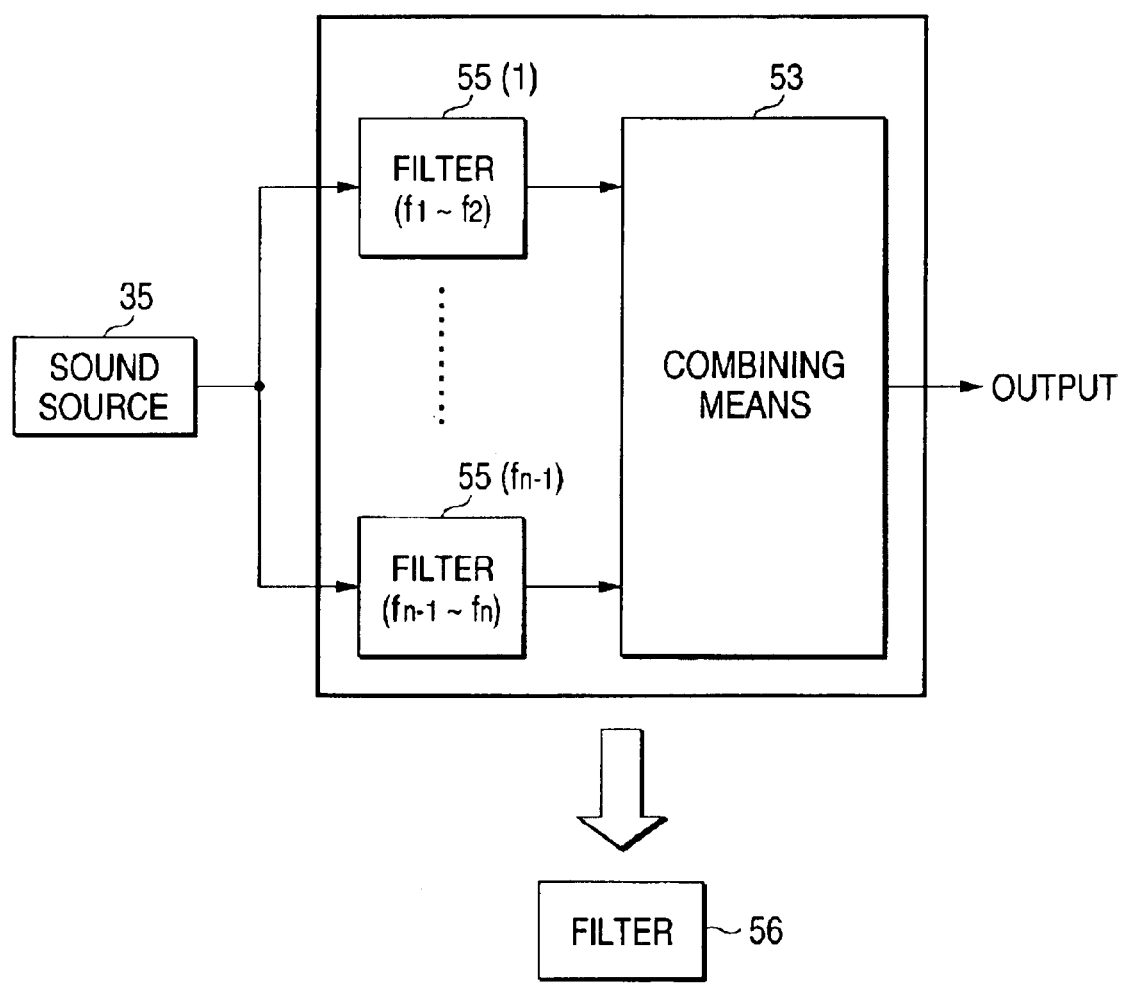
FIG. 14 is a diagram showing a third modified example in the sound field control system of the invention.

Next, a third modified example of a sound field control system of the invention will be described with reference to FIG. 14. In the modified example, the frequency band division means 51, the information addition means 52 and the gain adjusting means 54 are replaced with filters 55. Here, the filters 55 are filters substantially matched with transfer functions from the frequency band division means 51 to the gain adjusting means 54 to be formed. A system configuration becomes very simple.

Further, the system can also be configured by one filter 56 substantially matched with a transfer function between input and output of a signal.

The invention is not limited to the embodiments described above, and can be changed properly without departing from the claims and the subject matter or the idea of the invention capable of being read from the whole specification, and a sound field control method and a sound field control system with such a change are also included in the technical idea of the invention.

According to the invention as described above, control is targeted for environment reproducing sound, namely reverberation characteristics specific to a reproduction sound field, so that unlike pinpoint control in a listening position of a trans-aural system, reproduction sound with realism equal to that of a wide room can be obtained even when a listening position deviates. Therefore, also in the case of a narrow room interior like a car, it can listen with realism similar to that of the case of listening in a wide room and it is an extremely effective system.

Also, in a form of controlling reverberation characteristics every divided frequency band, specific reverberation characteristics are controlled in each the frequency band, so that realism similar to that of an original sound field can be obtained more effectively.

Further, instead of an inverse filter required in a conventional system, a stable approximate filter can be used and it can be configured by a relatively small system.

What is claimed is:

1. A sound field control method comprising the steps of:
   measuring reverberation characteristics of a first sound field used as the reference;
   measuring reverberation characteristics of a second sound field for listening;
   detecting a difference between the reverberation characteristics of the first sound field and the reverberation characteristics of the second sound field measured;
   calculating information added to a sound source offered to listening in the second sound field based on the difference between the reverberation characteristics detected; and
   adding the calculated information to the sound source.

2. A sound field control method comprising:
   dividing a sound source offered to listening into predetermined frequency bands;
   measuring reverberation characteristics of a first sound field used as the reference, in each of the divided frequency bands;
   measuring reverberation characteristics of a second sound field for listening, in each of the divided frequency bands;
   detecting a difference between the reverberation characteristics of the first sound field and the reverberation characteristics of the second sound field measured, in each of the divided frequency bands;
   calculating information added to a sound source offered to listening in the second sound field based on the difference between the reverberation characteristics detected, in each of the divided frequency bands;
   adding the calculated information of each of the frequency bands the sound source; and
   combining the sound source to which the-information is added in each of the frequency bands.

3. The sound field control method as claimed in claim 1 or 2, wherein the information added to the sound source is reflected sound information.

4. The sound field control method as claimed in claim 1 or 2, wherein measurement of the reverberation characteristics is made by driving a speaker by a predetermined signal and collecting a sound wave issued from the speaker by a microphone placed in a predetermined position and analyzing an impulse response between the speaker and the microphone from the predetermined signal and sound information collected by the microphone.

5. The sound field control method as claimed in claim 1 or 2, wherein measurement of the reverberation characteristics and calculation of information added to the sound source are made with respect to plural speakers.

6. A sound field control system comprising:
   means for measuring reverberation characteristics of a first sound field used as the reference;
   means for measuring reverberation characteristics of a second sound field for listening;
   means for detecting a difference between the reverberation characteristics of the first sound field and the reverberation characteristics of the second sound field measured;
   means for calculating information added to a sound source offered to listening in the second sound field based on the difference between the reverberation characteristics detected; and
   means for adding the calculated information to the sound source.

7. A sound field control system comprising:
   means for dividing a sound source offered to listening into predetermined frequency bands;
   means for measuring reverberation characteristics of a first sound field used as the reference, in each of the divided frequency bands;
   means for measuring reverberation characteristics of a second sound field for listening, in each of the divided frequency bands;
   means for detecting a difference between the reverberation characteristics of the first sound field and the reverberation characteristics of the second sound field measured of the divided frequency bands;
   means for calculating information added to a sound source offered to listening in the second sound field based on the difference between the reverberation characteristics detected, in each of the divided frequency bands;
   means for adding the calculated information of each of the frequency bands to the sound source; and
   means for combining the sound source to which the information is added, in each of the divided frequency bands.

8. The sound field control system as claimed in claim 7, further comprising means for adjusting a gain, in each of the divided frequency bands.

9. The sound field control system as claimed in claim 8, further comprising a filter having a transfer function matching with a transfer function between input and output of a signal instead of the means for dividing the frequency bands, the means for adding the information to the sound source, the means for adjusting the gain and the means for combining the sound source.

10. The sound field control system as claimed in claim 8, wherein in each of the frequency bands, instead of the means for dividing the frequency bands, the means for adding the information to the sound source and the means for adjusting the gain, it is constructed using a filter having a transfer function matching with a transfer function between input and output of a signal through each of those means.

11. The sound field control system as claimed in claim 6 or 7, wherein the means for measuring the reverberation characteristics comprises a speaker, generation means of a predetermined signal inputted to said speaker, a microphone for collecting a sound wave issued from the speaker, and means for analyzing an impulse response between the speaker and the microphone from the predetermined signal and sound information collected by the microphone.

* * * * *